Sept. 30, 1958     L. E. KILMARX, JR     2,854,018
QUICK-DUMP EXTENSION FOR AIRPLANE TIRE VALVE
Filed Oct. 5, 1954
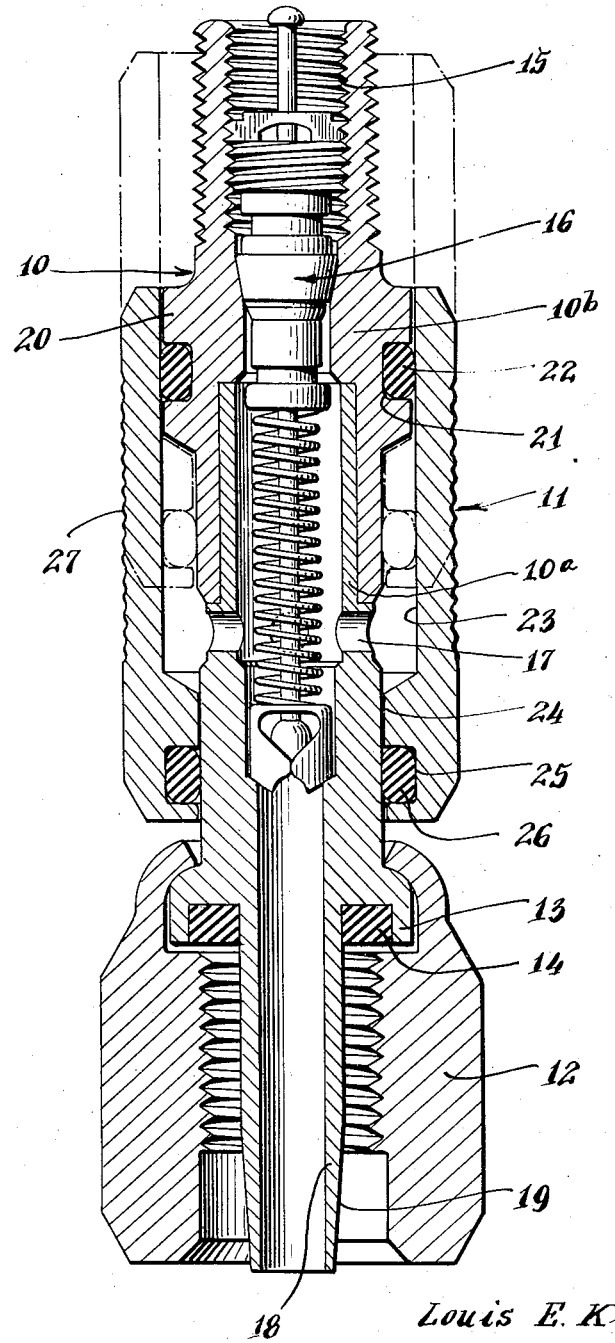
INVENTOR.
Louis E. Kilmarx Jr.
BY
Churchill, Rich, Weymouth & Engel
ATTORNEYS.

United States Patent Office
2,854,018
Patented Sept. 30, 1958

2,854,018

QUICK-DUMP EXTENSION FOR AIRPLANE TIRE VALVE

Louis E. Kilmarx, Jr., Massapequa Park, N. Y., assignor to Scovill Manufacturing Company, Waterbury, Conn., a corporation of Connecticut Application October 5, 1954, Serial No. 460,429

4 Claims. (Cl. 137—223)

The present invention relates to a quick dump valve through which air under pressure in a container, such as a tire, may be vented more quickly than through an inflating valve insides or core. The invention is particularly applicable to an extension fitting adapted to be applied to the valve stem of the tires on an airplane take-off and landing wheels.

Modern aircraft, such as commercial transport planes which are capable of sustained flight for thousands of miles, and heavy bombers when fully loaded, require that the tires thereof be inflated to high pressure to sustain the load during take-off. Such highly inflated tires, however, are hazardous for landing with a full load, especially in the event of an emergency, shortly after take-off, or before dissipation of a substantial portion of the load by consumption of fuel or disposal of the bombs. The venting of air through the inflation check valves in the tire valve stems on airplanes is too slow to cope with such an emergency, hence more rapid means for accomplishing such venting is required.

Accordingly, it is a primary object of the present invention to provide means for quickly venting or dumping air under pressure from a container to reduce the pressure therein.

A further object of the invention is to provide such dump means which will not be dependent upon the restricted passage through the inflation check valve.

A still further object of the invention is to provide said dump means directly associated with the tire valve stem on an airplane and which dump means are capable of being remotely operated by servomotors and the like while the tires are in either operative or retracted position.

The foregoing and other objects of the invention, not specifically enumerated, I accomplish by forming the valve stem, or an extension fitting for a valve stem from which the valve core or insides has been removed, with a vent port or quick dump opening and providing means which normally obturate said port or opening when the tire or container contains air under pressure, said means being movable to uncover the port or opening to vent any amount of air from the tire or container. More particularly, the invention consists of a tubular member provided at one end with means for attachment to an air container, at its other end with means adapted to contain a valve insides or core through which the container can be charged with air under pressure and with a vent port intermediate said ends, and means which normally obturate the vent port and is movable to uncover said port. The invention and its manner of use and application will be better understood from the detailed description which follows, when considered in connection with the accompanying drawing which shows in diametrical section, an embodiment of the invention as applied to an extension fitting.

Referring to the drawing, the invention may be said to consist of two principal parts, namely, a body or tubular member 10, and a sleeve 11 movably mounted on said tubular member in fluid-tight engagement therewith.

The body or tubular member 10 is provided at or adjacent one end, herein referred to as the inner end, with means for attachment to a tire or other receptacle (not shown) to be inflated. As herein shown, the attachment means is in the form of a nut 12 swivelly mounted on a flange 13 on the body member, said flange having an annular recess within which is contained a packing washer 14 adapted to make a fluid-tight seal with the outer end of a conventional valve stem when the nut 12 is threaded down over such valve stem. The body or tubular member at its opposite end, herein referred to as the outer end, is internally threaded, as shown at 15, to accommodate a conventional valve insides or core 16. Intermediate its ends, the body or tubular member is formed with a plurality of ports or openings 17 which are adapted to establish fluid communication between the bore of the tubular member and the atmosphere. At its inner end the tubular member is formed with a hollow needle portion 18 which, at its free end, is externally tapered toward the axis of the needle, as shown at 19, and adapted for insertion into the mouth of a valve stem to which the extension or fitting is adapted to be attached and from which valve stem the valve core has been removed. The length of the needle and the tapered portion thereon are so related that when the extension fitting is attached to a valve stem and the swivelly mounted nut 12 is screwed home on the valve stem, a press-fit will be provided between the tapered portion 19 of the needle and an annular edge in the valve stem provided at the juncture of the tapered shoulder and a cylindrical bore portion therein, which tapered shoulder and cylindrical bore portion accommodate the plug of a valve insides. As herein shown, and for convenience in manfacture and assembly, the tubular member 10 is formed of two parts, one of which, 10a, is provided with the coupling nut 12, hollow needle 18 and vent ports 17 and the other part of which, 10b, is formed with the internal screw-threads 15. The part 10b is formed with an enlarged external annular portion or rib 20 formed with an external, annular groove 21 within which is mounted an O packing ring 22.

The sleeve 11, which is mounted for slidable movement on the tubular member 10, is formed with a smooth inner wall 23 of but slightly larger diameter than the outer wall of the rib 20 for slidable engagement with the O-ring packing 22, and with a thickened internal flange 24 formed with an internal annular groove 25 within which is mounted an O packing ring 26. The outer wall of the member 10a below the vent openings 17 is smooth and of slightly smaller diameter than the inner wall of the internal rib 24 so as to slidably engage the O-ring packing 26.

In the assembly of the extension fitting the nut 12 is first swivelly mounted over the flange 13 on the part 10a. The sleeve 11 is then mounted over the external wall of the part 10a and the parts 10a and 10b are then force-fitted together in a conventional manner. When the parts are assembled, as shown in the drawing, it will be evident that the sleeve 11 is mounted on the tubular member 10 to prevent removal therefrom.

In use, the extension fitting with the sleeve 27 in its full line position is screwed onto a valve stem (not shown) from which the valve core has been removed by screwing the swivel nut 12 onto such stem, in the course of which operation the hollow needle 18 will engage the valve core shoulder in the stem to provide a press-fit therewith which will accomplish the dual function of providing a fluid-tight seal with such valve stem supplemental to the seal provided by the packing washer 14, and will also serve to provide a rigid assembly with such valve stem which will resist working loose under vibration. Air under pressure is then charged to the container or tire to which the fitting is attached through the valve insides or core 16 in a conventional manner. When inflation or the desired air under pressure is charged into the container or tire, the check valve of the core 16 seals and traps the air in the container. Gauging and normal deflation or venting of the container can be accomplished at the valve core end of the extension by unseating the check valve therein. When the parts are in the position shown in the drawing, air from the container in passing through the vent opening 17 is trapped and cannot vent to the atmosphere by virtue of the O packing rings 22 and 25. Air under pressure, however, will fill the space between the sleeve 11 and the tubular member 10 and will act upon the sleeve to move it downwardly to its limiting position in engagement with the top of the swivel nut.

If rapid deflation or dumping of air from the container is desired, the sleeve 11, which may be knurled as shown at 27, is pulled away from the swivel nut 12 or upwardly to uncover the vent ports or openings 17, whereupon air is discharged through said ports to the atmosphere. The sleeve must be mechanically or otherwise held in its open or up position since the air pressure trapped between the O-rings 22 and 25 on the sleeve and the tubular member respectively tends to return the sleeve to its initial position. Of course, where the extension fittings are mounted on the tires of airplane wheels, mechanical or servo-operated means may be employed for moving the sleeve when the wheels are either in operating or retracted position.

From the foregoing detailed description it will be apparent that I have provided simple and novel means for rapidly reducing the pressure or venting air from a container, and while I have shown the invention as applied to an extension fitting, it will be apparent that the barrel 10 may be directly connected to a container for compressed air such as the inner tube of a pneumatic tire in a manner well known in the art. It will also be appreciated that certain changes in details of construction and relationship of parts may be made within the range of mechanical and engineering skill without departing from the spirit of the invention as hereinafter defined in the claims.

What I claim is:

1. A valve comprising a tubular member having a longitudinal through bore having an inner end and an outer end and provided at its inner end with means adapted for attachment to a container for air under pressure, at its outer end with a check valve through which such container can be charged with air under pressure, and between said check valve and said inner end with a vent port, a sleeve mounted on said tubular member for slidable axial movement thereover to selectively obturate and uncover the vent port, the tubular member being formed with an external annular rib on the check valve end thereof having mounted thereon a packing ring over which the inner wall of the sleeve is slidable, and the sleeve being formed with an internal annular rib having mounted therein a packing ring slidable over the portion of the outer surface of the tubular member containing the vent port, movement of the sleeve toward the outer end of the tubular member serving to uncover the vent port.

2. A valve according to claim 1, wherein the rib on the sleeve is engageable with the rib on the tubular member to limit the outward movement of the sleeve on the tubular member.

3. A valve according to claim 1, wherein the rib on the sleeve is engageable with the means at the inner end of the tubular member to limit the inward movement of the sleeve on the tubular member.

4. A valve according to claim 1, wherein a chamber is provided between the rib on the sleeve and the rib on the tubular member within which chamber air under pressure is trapped when the vent port is uncovered and said trapped air acts to return the sleeve to vent port obturating position.

References Cited in the file of this patent

UNITED STATES PATENTS

| | | |
|---|---|---|
| 1,606,519 | Exten | Nov. 9, 1926 |
| 1,926,800 | Casper | Sept. 12, 1933 |
| 1,944,739 | Hunt | Jan. 23, 1934 |
| 2,508,503 | Doepke | May 23, 1950 |

FOREIGN PATENTS

| | | |
|---|---|---|
| 383,733 | Germany | Oct. 17, 1923 |
| 403,949 | Italy | 1943 |